United States Patent [19]
Liebig et al.

[11] 4,163,032
[45] Jul. 31, 1979

[54] THERMOPLASTIC MOLDING COMPOSITIONS

[75] Inventors: Lothar Liebig; Frank Wingler; Karl-Heinz Ott, all of Leverkusen; Gert Humme, Odenthal; Alfred Pischtschan, Kuerten, all of Fed. Rep. of Germany

[73] Assignee: Bayer Aktiengesellschaft, Fed. Rep. of Germany

[21] Appl. No.: 953,000

[22] Filed: Oct. 20, 1978

[30] Foreign Application Priority Data

Oct. 26, 1977 [DE] Fed. Rep. of Germany ....... 2747823

[51] Int. Cl.² ............................................. C08L 51/04
[52] U.S. Cl. ................................ 525/74; 260/29.7 D; 260/29.7 W; 260/29.7 UP; 260/29.7 T
[58] Field of Search ............... 260/876 R, 880 R, 881, 260/889, 893, 897 A, 29.7 D, 29.7 W, 29.7 UP, 29.7 T

[56] References Cited

U.S. PATENT DOCUMENTS 3,267,178  8/1966  Lee .................................. 260/880 R
3,278,642  10/1966  Lee .................................. 260/880 R
4,104,328  8/1978  Swoboda et al. .................. 260/876 R
4,107,234  8/1978  Cornell ............................ 260/876 R
4,113,798  9/1978  Moran .............................. 260/876 R

FOREIGN PATENT DOCUMENTS 1245131  7/1967  Fed. Rep. of Germany .
1949487  4/1971  Fed. Rep. of Germany .
1315219  5/1973  United Kingdom .

Primary Examiner—Thomas DeBenedictis
Attorney, Agent, or Firm—Connolly and Hutz

[57] ABSTRACT

A thermoplastic molding composition having improved flow, toughness. and heat distortion comprising a polymer mixture of (A) 25 to 95% by weight of a graft polymer of 70 to 30% by weight of a mixture of styrene (95 to 50% by weight) and acrylonitrile (5 to 50% by weight) on 30 to 70% by weight of an EPDM-rubber, and (B) 50 to 75% by weight of a terpolymer of acrylonitrile, maleic acid anhydride and styrene, the terpolymer containing 10 to 30 parts by weight of acrylonitrile, 7.5 to 15 parts by weight of maleic acid anhydride, and 82.5 to 55 parts by weight of styrene in copolymerised form.

4 Claims, No Drawings

THERMOPLASTIC MOLDING COMPOSITIONS

High impact thermoplastic moulding compositions can be produced, for example, by polymerising styrene (S) and acrylonitrile (A) in the presence of polybutadiene (B) ("ABS-polymers"). By using an amorphous polyolefin instead of polybutadiene, a considerable improvement in weather resistance is obtained providing the polyolefin does not contain C=C bonds in the main chain. For example EPDM rubbers of ethylene (E), propylene (P) and an unconjugated diene (D) are used and "AES-polymers" are obtained, i.e. thermoplastic materials in which acrylonitrile (A) and styrene (S) are graft polymerised onto an EPDM rubber (E).

In general, AES- and ABS-plastics consist of two phases. The continuous phase is a copolymer of the monomers grafted on, generally a styrene-acrylonitrile copolymer ("SAN-thermoplast"). The discontinuous phase incorporated is the actual graft polymer. By virtue of its grafted-on side chains ("SAN-sheath"), it is compatible with the copolymer.

Thus, German Offenlegungsschrift No. 1,949,487 describes mixtures of graft polymers of styrene and acrylonitrile on a rubber having a glass transition temperature below −30° C. with copolymers of styrene, maleic acid anhydride and, optionally, acrylonitrile which may additionally contain a copolymer of styrene and acrylonitrile (SAN-resin).

The present invention provides thermoplastic molding compositions of (A) 25 to 95% by weight of a graft polymer of 70 to 30% by weight of a mixture of styrene (95 to 50% by weight) and acrylonitrile (5 to 50% by weight) on 30 to 70% by weight of EPDM-rubber, and (B) 5 to 75% by weight of a terpolymer of acrylonitrile, maleic acid anhydride and stryene, wherein the terpolymer contains 10 to 30 parts by weight of acrylonitrile, 7.5 to 15 parts by weight of maleic acid anhydride, and 82.5 to 55 parts by weight of styrene in copolymerised form, the parts adding up to 100.

The graft polymers used in accordance with the invention are known. They may be obtained by polymerising styrene and acrylonitrile in the presence of the rubber. In that case, at least part of the styrene and acrylonitrile is graft polymerised onto the rubber. In addition, ungrafted styrene-acrylonitrile copolymer is generally present. The graft copolymers can be obtained in known manner by subjecting styrene and acrylonitrile to radical polymerisation in the presence of the rubber in bulk, emulsion, suspension or solution and also by combined processes such as bulk/suspension polymerisation or solution/precipitation polymerisation.

Suitable EPDM-rubbers are copolymers of ethylene, propylene and an unconjugated diene. The ratio by weight of ethylene to propylene is preferably from 75:25 to 40:60. The diene is incorporated in the copolymer in such quantities and in such a form that iodine numbers of from 2 to 30 are measured, corresponding to approximately 1 to 15 C=C bonds per 1000 carbon atoms. The monomer units may be arranged statistically or in blocks.

The terpolymer of acrylonitrile, maleic acid anhydride and styrene has to be synthesized from 10 to 30 parts by weight of acrylonitrile units, 7.5 to 15 parts by weight of maleic acid anhydride units and 82.5 to 55 parts by weight of styrene units. The material must have a narrow molecular weight distribution which can be expressed by the heterogeneity index $U = \overline{M}_w / \overline{M}_n - 1$ ($\overline{M}_w$ = weight average molecular weight, $\overline{M}_n$ = number average molecular weight). The heterogeneity index is 0.5 to 1.5 and preferably 0.8 to 1.2. The terpolymers also have to be chemically uniform. This means that the individual molecular weight fractions of a given polymer have to have the same quantitative ratio of acylonitrile/maleic acid anhydride/styrene units.

Acrylonitrile/maleic acid anhydride/styrene terpolymers having this structure can be obtained by continuous mixed polymerisation under stationary conditions. In the context of the invention, stationary conditions mean that the concentration of all the reactants and the composition of the polymers formed remain substantially constant throughout the polymerisation reaction. In a continuously operated, ideally mixed tank reactor, constant conditions are generally established after about 30 minutes to 24 hours, as measured from the beginning of the polymerisation reaction. Provision has to be made for ideal mixing; in other words, the mixing-in time must amount to at most only 1/10th of the average residence time in the reactor. The continuous polymerisation reaction is preferably carried out in a tank reactor using peroxide initiators which have a decomposition rate constant K at 100° C. of at least $5 \times 10^{-3}/\text{sec}^{-1}$. For polymerisation tempertures in the range of from 60° to 150° C. it is possible to use for example tert.-butyl peroctoate, benzoyl peroxide, lauryl peroxide, tert.-butyl perpivalate, isopropyl peroxy dicarbonate, 2-ethyl hexyl peroxy dicarbonate and acetyl cyclohexyl sulphonyl peroxide. The initiators are preferably used in quantities of from 0.01 to 0.5% by weight. Transfer agents or chain terminators may be used in this polymerisation reaction.

The weight ratio between the monomers introduced has to be selected in such a way that a polymer having the required composition is formed. The exact monomer composition for a desired polymer has to be determined by preliminary tests. For example, the continuous polymerisation of a mixture of 74% by weight of styrene, 22% by weight of acrylonitrile and 4% by weight of maleic acid anhydride with a stationary conversion of 35%, gives a terpolymer which is particularly suitable for use in accordance with the invention.

The continuous polymerisation reaction under stationary conditions is generally carried out in the absence of added solvent. It is terminated at a conversion of from 30 to 40% by weight, after which the resulting solution of the terpolymer in the monomer mixture is worked up by concentration through evaporation and returning the monomers recovered to the process. Concentration of the solution by evaporation is carried by the usual methods, for example by flash evaporation, screw evaporation, thin-layer evaporation or falling-film evaporation and spray drying.

Terpolymers whose acrylonitrile content is of the order of the acrylonitrile content of the graft polymers are particularly suitable for the molding compositions according to the invention.

By comparison with molding compositions of the same graft polymers and SAN-copolymers, the molding compositions according to the invention show good flow properties and an equally good toughness level coupled with a thermal stability under load increased by at least 12° C.

The molding compositions according to the invention may be used with particular advantage for applications requiring high weather resistance, high dimensional stability under heat, high toughness and easy processibility. Thus, they may be used with advantage, for example, for the production of pipelines, high-quality seals, vessels, instruments sterilisable with superheated steam, washing machine components, battery cases, dry battery housings, housings and other insulating components, in electrically operated machines, electrical insulating films, hydrolysis-stable vessel linings, chemically and thermally resistant filter cloths and many other things.

EXAMPLES (A) Graft polymer based on EPDM-rubber:

48 parts of EPDM-rubber based on dicyclopentadiene (iodine number 11, Mooney 70) are dissolved in 300 parts of benzene. 37.5 parts of styrene and 14.5 parts of acrylonitrile are added and the solution is heated to 120° C. Following the addition of 0.9 part of di-tert.-butyl peroxide, the mixture is polymerised for 12 hours. 0.5 part of 2,6-di-tert.-butyl-p-cresol is then added to the polymer solution and the polymer is isolated by stripping. The polymer product is dried at 70° C. in a vacuum drying cabinet.

(B) Production of the terpolymer of styrene, acrylonitrile and maleic acid anhydride ("SAMA-copolymer"):

2000 parts of a mixture of 7260 parts of styrene, 2200 parts of acrylonitrile, 440 parts of maleic acid anhydride and 25 parts of tert.-dodecylmercaptan are introduced into a jacketed reaction vessel provided with a blade stirrer, a temperature sensor, and an inlet and outlet pipe. The contents of the reactor are then heated to 95° C. and the polymerisation reaction is initiated at that temperature, the mixture being delivered to the reactor at a rate of 2000 parts per hour and the same quantity being run off from the reactor at the same time. The initiator is also continuously added to the reactor: 0.6 parts per hour of tert.-butyl perpivalate (75% in dibutyl phthalate), so that a polymer solution having a solids content of approximately 30% is formed after about 2 hours. 0.1% by weight of 2,6-di-tert.-butyl-p-cresol is added to the solution of the polymer in the monomers removed from the reaction vessel, which is then freed from the monomers and the volatile constituents in an evaporation extruder.

The SAMA-copolymer contains 17% by weight of acrylonitrile, 12% by weight of maleic acid anhydride and 71% by weight of styrene.

The intrinsic viscosity $[\eta]$ amounts to 0.7 dl/g.

The distribution of monomers in fractions of different molecular weight is shown in the following Table:

| Fraction No. | % by weight | $[\eta]$ | % by weight AN | % by weight MSA | % by weight styrene |
|---|---|---|---|---|---|
| 1 | 4.21 | 1.28 | 18.0 | 12.3 | 69.7 |
| 2 | 7.25 | 1.09 | 18.6 | 12.7 | 68.7 |
| 3 | 19.16 | 0.96 | 17.2 | 12.9 | 69.9 |
| 4 | 9.73 | 0.86 | 18.6 | 11.9 | 69.5 |
| 5 | 11.14 | 0.77 | 18.4 | 12 | 69.6 |
| 6 | 11.52 | 0.64 | 18.0 | 11.5 | 70.5 |
| 7 | 11.91 | 0.52 | 16.5 | 12.0 | 71.5 |
| 8 | 26.75 | 0.50 | 13.5 | 12.1 | 74.4 |

Fractionation was carried out from dimethyl formamide with cyclohexane at a temperature of 78° C.

(C) Production of the mixture:

The components are mixed in an internal kneader, spun off in the form of strands, granulated and injection-moulded to form test specimens. Table 1 shows the mixtures of graft polymer (A) with copolymers of different composition produced in the same way as (B). A standard commercial-grade SAN-copolymer of 75% by weight of styrene and 25% by weight of acrylonitrile having an intrinsic viscosity of 0.70 dl/g is used in comparison test 6.

TABLE 1

| Ex. | Component Ratio Comp. (A) | Component Ratio Comp. (B) | Composition Comp. (B) | S | A | MSA | $a_n$ 20° C. | $a_n$ −40° C. | $a_k$ 20° C. | $a_k$ 0° C. | $a_k$ −40° C. | Vicat 0° C. | MFI 220° C. 10kp |
|---|---|---|---|---|---|---|---|---|---|---|---|---|---|
| | | | a | 78 | 10 | 12 | 20 | — | 2 | — | — | 118 | 10.5 |
| | | | b | 75.5 | 17 | 7.5 | — | — | — | — | — | 112 | 35 |
| | | | c | 72 | 17 | 11 | 10 | 22 | 2.1 | 1.6 | 1.7 | 117 | 11.4 |
| | | | d | 69 | 17 | 14 | 20 | 18 | 2 | 1.5 | 1.6 | 120 | 7.2 |
| | | | e | 64 | 24 | 12 | 24 | — | 2 | — | — | 120 | 12 |
| | | | f | 75 | 25 | — | — | — | — | — | — | 99 | 22 |
| 1 | 40 | 60 | a | | | | 69 | 77 | 7.1 | 5.3 | 1.5 | 104 | 7.0 |
| 2 | 40 | 60 | b | | | | ub | 69 | 9.5 | 7.2 | 2.0 | 100 | 9.5 |
| 3 | 40 | 60 | c | | | | ub | (106)₅ | 12.7 | 8.6 | 2.8 | 103 | 7.8 |
| 4 | 40 | 60 | d | | | | (81)₁ | (83)₆ | 13.1 | 8.6 | 2.9 | 105 | 7.9 |
| 5 | 40 | 60 | e | | | | (73)₃ | 81 | 10.4 | 8.2 | 2.0 | 104 | 7.5 |
| 6 | 40 | 60 | f | | | | (60)₁ | 78 | 12.6 | 8.1 | 4.1 | 89 | 12.7 |

Component (A) = graft polymer of styrene and acrylonitrile on EPDM rubber according to A
Component (B) = copolymer of styrene, acrylonitrile and maleic acid anhydride according to B
S = styrene; A = acrylonitrile; MSA = maleic acid anhydride
$a_n$ = impact strength according to DIN 53 453. 10 standard small bars were tested in each case. Unless all the bars break under a given impact, the impact applied is put in brackets and the number of broken bars is indicated behind the figure in brackets.
ub = unbroken
$a_k$ = notched impact strength according to DIN 53 453
Vicat = dimensional stability under heat according to Vicat B in °C.
MFI = melt flow index according to DIN 53 755.

We claim:

1. A thermoplastic molding composition comprising a polymer mixture of
    (A) 25 to 95% by weight of a graft polymer of 70 to 30% by weight of a mixture of 95 to 50% by weight of styrene and of 5 to 50% by weight of and acrylonitrile on 30 to 70% by weight of an EPDM-rubber, and
    (B) 5 to 75% by weight of a terpolymer of acrylonitrile, maleic acid anhydride and styrene, the terpolymer containing
    10 to 30 parts by weight of acrylonitrile,
    7.5 to 15 parts by weight of maleic acid anhydride, and 82.5 to 55 parts by weight of styrene in copolymerised form.

2. A thermoplastic molding composition, as claimed in claim 1, wherein the terpolymer has a heterogeneity index U of 0.5 to 1.5.

3. A thermoplastic molding composition, as claimed in claim 1, wherein the terpolymer has been obtained by continuous mixed polymerisation under steady state concentration conditions.

4. A thermoplastic molding composition, as claimed in claim 1, wherein the acrylonitrile content of the terpolymer is substantially the same as that of the graft polymer.

* * * * *